United States Patent
Carrillo Alonso et al.

(10) Patent No.: US 10,738,499 B2
(45) Date of Patent: Aug. 11, 2020

(54) CONCRETE TOWERS MANUFACTURING METHOD FOR WIND TURBINES AND CONCRETE TOWER FOR WIND TURBINE

(71) Applicant: Acciona Windpower, S.A., Navarra (ES)

(72) Inventors: Luis Carrillo Alonso, Madrid (ES); Manuel Biedma Garcia, Madrid (ES); Ivan Garcia Maestre, Navarra (ES); Teresa Arlaban Gabeiras, Navarra (ES); Jose Luis Aristegui Lantero, Navarra (ES); Jose Miguel Garcia Sayes, Navarra (ES); Miguel Nunez Polo, Navarra (ES)

(73) Assignee: ACCIONA WINDPOWER, S.A., Navarra (ES)

( * ) Notice: Subject to any disclaimer, the term of this patent is extended or adjusted under 35 U.S.C. 154(b) by 0 days.

(21) Appl. No.: 15/443,606

(22) Filed: Feb. 27, 2017

(65) Prior Publication Data

US 2017/0247901 A1    Aug. 31, 2017

(30) Foreign Application Priority Data

Feb. 26, 2016    (EP) .................................... 16382082

(51) Int. Cl.
| | | |
|---|---|---|
| *E04H 12/34* | (2006.01) | |
| *E04H 12/16* | (2006.01) | |
| *E04H 12/12* | (2006.01) | |
| *F03D 13/10* | (2016.01) | |
| *E04H 12/00* | (2006.01) | |
| *E04G 11/20* | (2006.01) | |
| *E04G 11/28* | (2006.01) | |

(52) U.S. Cl.
CPC .......... *E04H 12/342* (2013.01); *E04H 12/12* (2013.01); *E04H 12/16* (2013.01); *E04H 12/341* (2013.01); *F03D 13/10* (2016.05); *E04G 11/20* (2013.01); *E04G 11/28* (2013.01); *E04H 2012/006* (2013.01); *F05B 2230/61* (2013.01); *F05B 2240/912* (2013.01); *Y02E 10/728* (2013.01); *Y02P 70/523* (2015.11)

(58) Field of Classification Search
CPC ..... E04H 12/342; E04H 12/12; E04H 12/341; E04H 12/16; E04H 2012/006; E04G 11/20; E04G 11/28; F03D 13/10; F05B 2230/61; F05B 2240/912
USPC ......................................................... 52/123.1
See application file for complete search history.

(56) References Cited

U.S. PATENT DOCUMENTS

| | | | | | |
|---|---|---|---|---|---|
| 1,020,005 | A | * | 3/1912 | Witthoefft | ............... B22C 9/101 249/17 |
| 1,301,364 | A | * | 4/1919 | Biggs | ........................ B28B 7/02 249/159 |

(Continued)

FOREIGN PATENT DOCUMENTS

| | | |
|---|---|---|
| DE | 102011053017 A1 | 2/2013 |
| EP | 1227204 B1 | 7/2002 |

*Primary Examiner* — Patrick J Maestri
*Assistant Examiner* — Joseph J. Sadlon
(74) *Attorney, Agent, or Firm* — Hayes Soloway PC

(57) ABSTRACT

The present invention relates to a manufacturing process in situ of concrete towers for wind turbines which enables executing a design of concrete tower manufactured in situ by means of climbing formwork, which reduces the execution time of the concrete tower, where the invention also relates to the associated concrete tower for wind turbine.

14 Claims, 3 Drawing Sheets

(56) References Cited

U.S. PATENT DOCUMENTS

| | | | | |
|---|---|---|---|---|
| 2,722,040 A * | 11/1955 | Ludowici | E04B 1/0007 | 52/741.15 |
| 2,730,207 A * | 1/1956 | Hall | E04H 12/34 | 137/625.24 |
| 2,857,994 A * | 10/1958 | Sheard | E04H 12/34 | 182/178.2 |
| 3,211,427 A * | 10/1965 | Bristow, Jr. | E04H 12/34 | 254/89 H |
| 3,497,579 A * | 2/1970 | Barron | E04G 11/26 | 264/33 |
| 3,761,551 A * | 9/1973 | Ogata | E04H 12/341 | 264/33 |
| 3,871,612 A * | 3/1975 | Weaver | E04G 11/062 | 249/1 |
| 3,901,472 A * | 8/1975 | Ahlgren | E04G 11/22 | 249/20 |
| 3,974,618 A * | 8/1976 | Cortina | E04L 31/3538 | 414/11 |
| 3,991,969 A * | 11/1976 | Oxyer | B28B 7/02 | 249/10 |
| 4,016,228 A * | 4/1977 | Schmidt | E04G 11/24 | 249/20 |
| 4,076,778 A * | 2/1978 | Whitting | E04G 11/28 | 249/22 |
| 4,272,465 A * | 6/1981 | Hough | E04G 11/40 | 249/20 |
| 4,272,929 A * | 6/1981 | Hanson | E02D 27/42 | 416/142 |
| 4,314,798 A * | 2/1982 | Pettersson | E04G 11/22 | 425/63 |
| 4,403,460 A * | 9/1983 | Hills | E04H 12/30 | 264/33 |
| 4,688,967 A * | 8/1987 | Einstabland | E02B 17/02 | 405/195.1 |
| 4,915,345 A * | 4/1990 | Lehmann | E04G 11/062 | 249/10 |
| 4,974,700 A * | 12/1990 | Gates | E04G 11/06 | 182/128 |
| 5,072,555 A * | 12/1991 | Geiger | E04B 1/3404 | 52/148 |
| 5,125,617 A * | 6/1992 | Miller | E04G 11/065 | 249/11 |
| 5,492,303 A * | 2/1996 | Jaruzel | E04G 11/065 | 249/1 |
| 5,946,881 A * | 9/1999 | Chatelain | E04H 12/12 | 249/51 |
| 6,260,311 B1 * | 7/2001 | Vladikovic | E04G 11/28 | 249/20 |
| 6,299,137 B1 * | 10/2001 | Bainter | B66F 3/28 | 254/1 |
| 6,425,712 B1 * | 7/2002 | Vanderklaauw | B66F 1/025 | 248/354.1 |
| 6,470,645 B1 * | 10/2002 | Maliszewski | E04H 12/085 | 52/745.18 |
| 6,513,789 B2 * | 2/2003 | Kimura | C21L 37/00 | 254/89 H |
| 6,557,817 B2 * | 5/2003 | Waldschmitt | E04G 11/28 | 182/36 |
| 7,004,737 B2 * | 2/2006 | Russell | E04B 1/3404 | 425/63 |
| 7,866,121 B2 * | 1/2011 | Polyzois | B29C 70/30 | 52/848 |
| 8,297,025 B2 * | 10/2012 | Huynh Tuong | E04H 12/02 | 52/745.17 |
| 8,316,614 B2 * | 11/2012 | Soe-Jensen | B66C 1/62 | 52/745.17 |
| 8,621,817 B1 * | 1/2014 | Kreizinger | B28B 23/0068 | 264/71 |
| 8,931,235 B2 * | 1/2015 | Baker | F03D 1/001 | 52/745.17 |
| 9,016,029 B2 * | 4/2015 | Wagner | F03D 13/10 | 52/745.17 |
| 9,032,674 B2 | 5/2015 | Schibsbye | E02D 27/42 | 52/223.4 |
| 9,175,670 B2 * | 11/2015 | Lockwood | E04H 12/16 | |
| 9,388,598 B2 * | 7/2016 | Stiesdal | E04H 12/341 | |
| 9,617,752 B2 * | 4/2017 | Wagner | F03D 13/20 | |
| 9,657,722 B2 * | 5/2017 | Wagner | E04H 12/12 | |
| 9,663,330 B2 * | 5/2017 | Moeller | B66C 1/62 | |
| 10,066,413 B2 * | 9/2018 | Khoshnevis | E04H 12/341 | |
| 10,107,265 B2 * | 10/2018 | Lafferty | E02D 27/42 | |
| 10,287,794 B2 * | 5/2019 | Neighbours | F03D 13/20 | |
| 2006/0156681 A1 * | 7/2006 | Fernandez Gomez | E04H 12/02 | 52/837 |
| 2010/0281818 A1 * | 11/2010 | Southworth | E02D 27/42 | 52/745.17 |
| 2012/0311948 A1 * | 12/2012 | Hangel | B66C 1/66 | 52/295 |
| 2014/0150359 A1 * | 6/2014 | Werner | E04H 12/085 | 52/223.5 |
| 2014/0348662 A1 * | 11/2014 | Schibsbye | E04H 12/341 | 416/244 A |

* cited by examiner

CONCRETE TOWERS MANUFACTURING METHOD FOR WIND TURBINES AND CONCRETE TOWER FOR WIND TURBINE

OBJECT OF THE INVENTION

The present invention relates to a manufacturing process of concrete towers for wind turbines which enables executing a concrete tower design manufactured in situ by means of climbing formwork which reduces the execution time of the tower.

The invention also relates to the associated concrete tower for wind turbine.

BACKGROUND OF THE INVENTION

Current rotors have an increasingly large diameter to increase wind power uptake, which, together with the need to place them at a sufficient height to reduce the cutting effect of the wind, it means that the height of the towers that support them must be increasingly high. At present, the towers exceed 100-120 m in height and their construction typically involves the use of large cranes for lifting loads that have limited availability, which makes the project more expensive.

There are currently several methods for the construction of concrete towers for wind turbines; on the one hand, there are processes where the prefabricated concrete elements are joined together to form tower sections which will be later placed one on another to form the wind turbine tower and, on the other hand, those where the tower is built in situ from a formwork with the geometry of each section of the tower which is filled with concrete and steel and it is climbed as it cures to give the height the required height.

Each process has certain advantages with respect to the other. For example, using prefabricated concrete elements shortens the assembly time of the tower with respect to building the tower completely in situ, but demands having large-capacity cranes in the wind farm location to lift loads during a greater period of time.

Furthermore, in terms of tower geometry, it is typically preferred that it has a section that decreases with height, with truncated cones being frequent. This involves modifying the geometry of the internal and external formworks with high frequency, when the construction process is in situ by means of climbing formworks, increasing the number of operations to perform and slowing down the construction time.

All these drawbacks are resolved with the invention disclosed below.

DESCRIPTION OF THE INVENTION

The present invention relates to a manufacturing process of concrete towers for wind turbines and to a concrete tower for wind turbines formed by a reduced number of different cylindrical sections which enables achieving a compromise between the speed of tower construction and the overuse of materials.

Since the construction of each different cylindrical section may require a manoeuvre to change formwork system, the fewer number of different cylindrical sections that the tower has, the faster its execution will be but the greater the cost of materials will be. Whilst with a greater number of sections the process would involve a longer construction time although material consumption would be optimized. The tower of the present invention achieves said commitment so that the assembly time and resources and the use of materials are optimized overall.

The increase in construction time that would be involved in executing a truncated cone-shaped tower in situ is so significant due to the number of changes in formworks that the increase in material consumption involved in implementing a tower of cylindrical sections by means of the process of the present invention is compensated.

Thus, the proposed process consists of manufacturing in situ the concrete tower using a first climbing formwork system to form cylindrical sections, where the number of operations to change the formwork system is minimized or even eliminated, since the maximum variation in diameter between the larger diameter of a first cylindrical section of concrete tower and the smaller diameter of a second cylindrical section of concrete which will be described below, is delimited so that it is not necessary to use a second climbing formwork system.

In this way, the time during which large-capacity cranes are used for the construction of wind farms is reduced, providing a specific design of concrete tower manufactured in situ by means of a climbing formwork system and an associated process, which reduce the execution time of the tower with respect to other in situ manufacturing solutions.

The manufacturing process of concrete towers for wind turbines comprises:

an execution stage of a first cylindrical section of concrete tower by means of a first climbing formwork system; and an execution stage of a second cylindrical section of concrete tower by means of the first climbing formwork system so that an outer diameter of the second cylindrical section is smaller than an outer diameter of the first cylindrical section, where the execution stage of the second cylindrical section is carried out at a height greater than the execution stage of the first cylindrical section.

Optionally, the execution stage of the second cylindrical section of concrete tower is carried out so that an inner diameter of the second cylindrical section is smaller than an inner diameter of the first cylindrical section.

Optionally, the execution stage of the first cylindrical section and/or the execution stage of the second cylindrical section comprises a modification sub-stage of an inner formwork of the first climbing formwork system and/or of the second climbing formwork system respectively, preferably so that the thickness of the first cylindrical section and/or the second cylindrical section are decreasing in height, reducing the weight of the tower.

Optionally, the manufacturing process of concrete towers for wind turbines also comprises a construction stage of an intermediate transition section before the execution stage of the second cylindrical section of concrete tower.

The construction stages of the intermediate transition section and execution stage of the second cylindrical section of concrete tower are repeated until the second cylindrical section is an upper cylindrical section of concrete tower.

After the execution stage of the second cylindrical section of concrete tower, where said second cylindrical section is the upper cylindrical section of concrete tower, the manufacturing process of concrete towers comprises a construction stage of a top section of concrete tower, preferably on the upper cylindrical section of concrete tower, which allows that the top section of concrete tower and the upper cylindrical section of concrete tower are continuously executed, without horizontal or vertical joints.

Optionally, the manufacturing process comprises an assembly stage of the first climbing formwork system on a section of concrete tower manufactured prior to the execution stage of the first cylindrical section of concrete tower.

The construction stage of the intermediate transition section can be carried out on the first cylindrical section, preferably by means of an adaptation stage of the first climbing formwork system, for the in situ construction of the intermediate transition section, which allows that the intermediate transition section and the first cylindrical section are executed continuously, without horizontal or vertical joints.

Optionally, the manufacturing process comprises, after the construction stage of the intermediate transition section and before the execution stage of the second cylindrical section, an adaptation stage of an outer formwork of the first climbing formwork system to the outer diameter of the second cylindrical section. In this way, it is possible to adapt the first climbing formwork system to the geometry of the second cylindrical section without having to replace it by a second formwork system which increases the total assembly time of the tower.

Preferably, the execution stage of the first cylindrical section and/or the execution stage of the second cylindrical section comprise the following sub-stages:
    a lifting sub-stage of a framework;
    a fixing sub-stage of the framework to the previously manufactured cylindrical section;
    a closing sub-stage of the first climbing formwork system;
    a pouring sub-stage of the concrete inside the first climbing formwork system;
    an opening sub-stage of the first climbing formwork system;
    a climbing sub-stage of the first climbing formwork system;
    where said sub-stages are repeated until all of the first cylindrical section and/or all of the second cylindrical section, respectively, has been executed.

Thus established, both the first cylindrical section and the second cylindrical section are continuously executed, without horizontal or vertical joints.

The invention also relates to the concrete tower for wind turbines comprising at least two sections of constant outer diameter, a first cylindrical section and a second cylindrical section, where the second cylindrical section is higher than the first cylindrical section and where an outer diameter of the second cylindrical section is smaller than an outer diameter of the first cylindrical section, where the first cylindrical section and the second cylindrical section are both intended to be executed in situ by means of a first climbing formwork system.

Optionally, the concrete tower also comprises an intermediate transition section disposed between the first cylindrical section and the second cylindrical section, where, preferably said intermediate transition section is a section which is intended to be executed in situ or a prefabricated concrete element.

Optionally, the concrete tower also comprises a top section disposed on the second cylindrical section or on an upper cylindrical section, where, preferably said top section is a section which is intended to be executed in situ or a prefabricated concrete element.

Optionally, the concrete tower also comprises a lower section of concrete tower which is lower than the first cylindrical section, where said lower section of concrete tower has an outer diameter larger than the outer diameter of the first cylindrical section and where the first cylindrical section is intended to be executed on the lower section of concrete tower.

PREFERRED EMBODIMENT OF THE INVENTION

Figure 1:
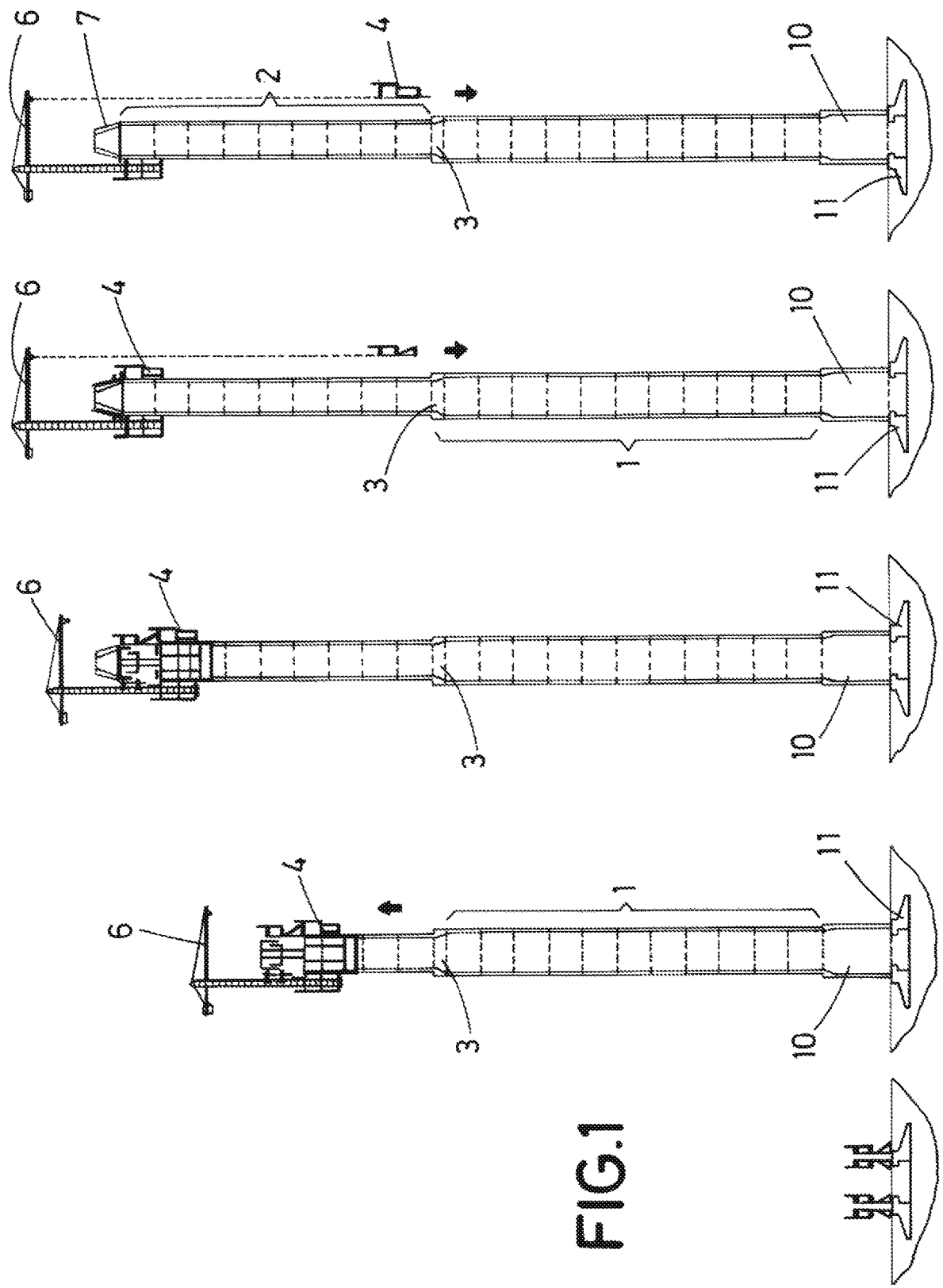
FIG. 1 shows a diagram of the different stages of the manufacturing process of concrete towers for wind turbines of the present invention, where the concrete tower thus manufactured comprises a first cylindrical section and a second cylindrical section.

The manufacturing process of concrete towers for wind turbines of the present invention shall be detailed below.

The manufacturing process of concrete towers for wind turbines comprises:
    an execution stage of a first cylindrical section (1) of concrete tower by means of a first climbing formwork system (4); and
    an execution stage of a second cylindrical section (2) of concrete tower by means of the first climbing formwork system (4) so that an outer diameter of the second cylindrical section (2) is smaller than an outer diameter of the first cylindrical section (1), where the execution stage of the second cylindrical section (2) is carried out at a height greater than the execution stage of the first cylindrical section (1).

Preferably, the manufacturing process also comprises a construction stage of an intermediate transition section (3) before the execution stage of the second cylindrical section (2) of concrete tower, where the construction stages of the intermediate transition section (3) and execution stage of the second cylindrical section (2) of concrete tower are repeated until the second cylindrical section (2) is an upper cylindrical section of concrete tower. Next, a top section (7) of concrete tower shall be constructed as shall be explained below.

The manufacturing process comprises an assembly stage of the first climbing formwork system (4) on a lower section (10) of concrete tower manufactured prior to the execution stage of the first cylindrical section (1) of concrete tower, where, preferably, the lower section (10) of concrete tower is manufactured in situ on foundations (11) of the concrete tower.

Figure 2:
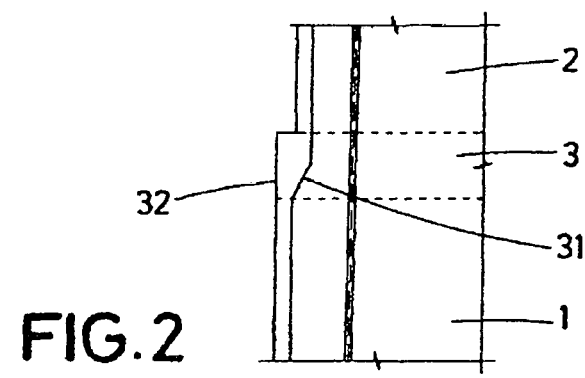
FIG. 2 shows a diagram of the construction stage of the intermediate transition section on the first cylindrical section, modifying the first climbing formwork system, so that the construction of the intermediate transition section is carried out in situ.
Figure 3:
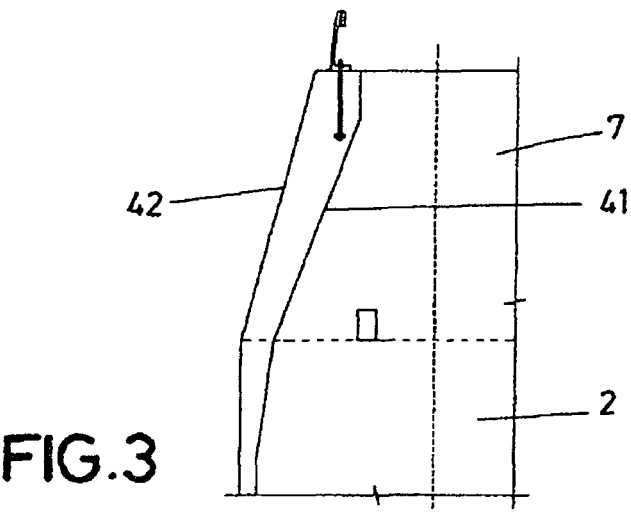
FIG. 3 shows a diagram of the construction stage of the top section of tower, installing an upper formwork system, so that the construction of the intermediate transition section is carried out in situ.

In a first example of embodiment, the construction stage of the intermediate transition section (3) is carried out on the first cylindrical section (1). In this way, the intermediate transition section (3) and the first cylindrical section (1) are continuously executed, without horizontal or vertical joints. This construction stage of the intermediate transition section (3) on the first cylindrical section (1) can be carried out in two ways:

Performing, before the construction stage of the intermediate transition section (3) on the first cylindrical section (1), an adaptation stage of the first climbing formwork system (4), for the in situ construction of the intermediate transition section (3), as shown in FIG. 2, where the adaptation stage of the first climbing formwork system (4) can be performed:

modifying an inner formwork of the first climbing formwork system (4), where, preferably, the inner formwork comprises at least one inclined section, so that it generates an inner surface (31) without steps;

modifying an outer formwork of the first climbing formwork system (4) or of the second climbing formwork system (5), where, preferably, the outer formwork comprises at least one inclined section, so that it generates an outer surface (32) without steps, so that the outer surface of the tower is highly aerodynamic;

modifying an inner formwork and an outer formwork of the first climbing formwork system (4) or of the second climbing formwork system (5), where, preferably, the inner formwork and the outer formwork comprise at least one inclined section, so that it generates an inner surface (31) without steps, and an outer surface (32) without steps, so that the outer surface of the tower is highly aerodynamic.

Performing, before the construction stage of the intermediate transition section (3) on the first cylindrical section (1), an assembly stage of a first non-climbing formwork system for the in situ construction of the intermediate transition section (3). In this case, the manufacturing process comprises, after the construction stage of the intermediate transition section (3) on the first cylindrical section (1), a dismantling stage of the first non-climbing formwork system.

In a second example of embodiment, the construction stage of the intermediate transition section (3) comprises a manufacturing stage of the intermediate transition section (3) in an area close to a base of the concrete tower and an installation stage of the intermediate transition section (3) manufactured in an area close to a base of the concrete tower, on the first cylindrical section (1), preferably using a crane (6) coupled to the first climbing formwork system (4). In this way, it avoids modifying the first climbing formwork system (4) and it dispenses with the concrete setting time as the intermediate transition element (3) is already prefabricated once it is installed on the first cylindrical section (1).

The manufacturing process of concrete towers for wind turbines comprises, after the construction stage of the intermediate transition section (3) and before the execution stage of the second cylindrical section (2), an adaptation stage of an outer formwork of the first climbing formwork system (4) to the outer diameter of the second cylindrical section (2) and preferably also an adaptation stage of an inner formwork of the first climbing formwork system (4) to an inner diameter of the second cylindrical section (2).

In a first example of embodiment, the construction stage of the top section (7) of concrete tower performed after the execution stage of the upper section of concrete tower is carried out on the upper cylindrical section of concrete tower. In this way, the upper cylindrical section and the top section (7) are continuously executed, without horizontal or vertical joints. This construction stage of the top section (7) on the upper cylindrical section can be carried out:

Performing, before the construction stage of the top section (7) on the upper cylindrical section, an assembly stage of a second non-climbing formwork system for the in situ construction of the top section (7), where the second non-climbing formwork comprises an inner formwork and an outer formwork, where, preferably, the inner formwork and the outer formwork comprise at least one inclined section, so that they generate an inner surface (41) and an outer surface (42) which enable the connection of one coil of the wind turbine to the tower.

In a second example of embodiment, the construction stage of the top section (7) of concrete tower comprises a manufacturing stage of the top section (7) in an area close to a base of the concrete tower. Preferably, this construction stage of the top section (7) comprises an installation stage of the top section (7) manufactured in an area close to a base of the concrete tower, on the upper cylindrical section, preferably using a crane (6) coupled to the first climbing formwork system (4). In this way, it dispenses with the concrete setting time as the top section (7) is already prefabricated once installed on the upper cylindrical section.

The execution stage of the first cylindrical section (1) and/or the execution stage of the second cylindrical section (2) comprise the following sub-stages:
    a lifting sub-stage of a framework;
    a fixing sub-stage of the framework to the previously manufactured cylindrical section (1, 2);
    a closing sub-stage of the first climbing formwork system (4);
    a pouring sub-stage of the concrete inside the first climbing formwork system (4);
    an opening sub-stage of the first climbing formwork system (4);
    a climbing sub-stage of the first climbing formwork system (4);
    where said sub-stages are repeated until all of the first cylindrical section (1) and/or all of the second cylindrical section (2), respectively, has been executed.

Figure 4:
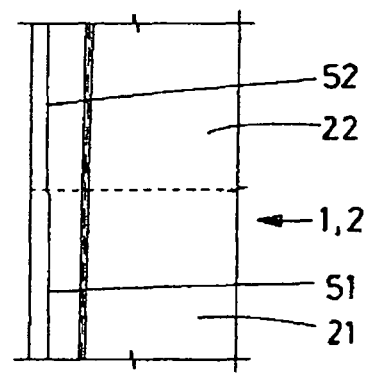
FIG. 4 shows a diagram of an embodiment of the first cylindrical section or of the second cylindrical section of the tower of the present invention.
Figure 5:
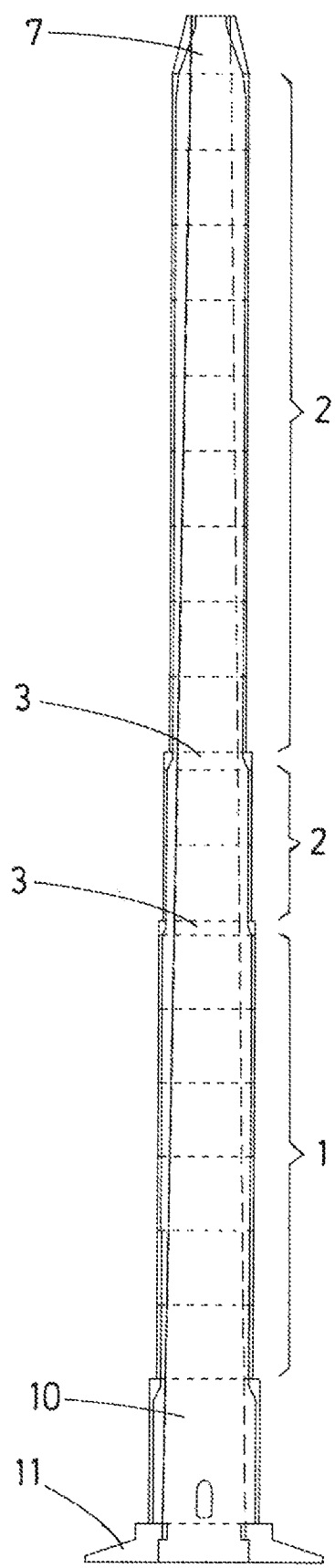
FIG. 5 shows an example of embodiment of concrete tower of the present invention, where the concrete tower comprises a first cylindrical section and two second cylindrical sections.

Preferably, the execution stage of the first cylindrical section (1) and/or the execution stage of the second cylindrical section (2) comprise a modification sub-stage of the inner formwork of the first climbing formwork system (4), so that the first cylindrical section (1) and/or the second cylindrical section (2) comprise at least one first sub-section (21) with a first inner diameter (51) and a second sub-section (22) with a second inner diameter (52), where the first inner diameter (51) of the first sub-section (21) is smaller than the second inner diameter (52) of the second sub-section (22), as observed in FIG. 4, so that the thickness of the first cylindrical section (1) and/or the second cylindrical section (2) is reduced to sections in height, thus reducing the weight of the tower.

The first climbing formwork system (4) and/or the second climbing formwork system (5) comprise a set of hydraulic jacks each one of which has two climbing heads, an upper climbing head disposed on a moving part of the hydraulic jack and a lower climbing head disposed on a fixed part of the hydraulic jack.

Each climbing head comprises a system of pins which makes it possible to be temporarily fixed to a mast which is vertically disposed on the tower surface as a guide or to the tower itself, where the upper climbing head of each hydraulic jack is also solidly joined to a main platform of the first formwork system or of the second formwork system.

The vertical displacement of the first formwork system or of the second formwork system is achieved by means of the actuation of the hydraulic jack combined with the opening and/or closing of the climbing heads.

Below, the concrete tower for wind turbines of the present invention shall be described in detail.

The concrete tower comprises at least two sections of constant outer diameter, a first cylindrical section (1) and a second cylindrical section (2), where the second cylindrical section (2) is higher than the first cylindrical section (1) and where an outer diameter of the second cylindrical section (2) is smaller than an outer diameter of the first cylindrical section (1):

Preferably, the first cylindrical section (1) and the second cylindrical section (2) are both intended to be executed in situ by means of a first climbing formwork system (4).

Preferably, the concrete tower also comprises an intermediate transition section (3) disposed between the first cylindrical section (1) and the second cylindrical section (2). In a first example of embodiment, the intermediate transition section (3) is a section which is intended to be executed in situ, whilst in a second example of embodiment, the intermediate transition section (3) is a prefabricated concrete element either formed by a single piece or formed by several modules. Preferably, the prefabricated concrete element is intended to be manufactured in an area close to a base of the concrete tower.

The intermediate transition section (3) comprises an inner surface with at least one section with truncated cone geometry (31), preferably with an upper part and a lower part, where the section with truncated cone geometry has, in the lower part, a larger diameter which is greater than or equal to an inner diameter of the first cylindrical section (1), and in the upper part a smaller diameter which is smaller than or equal to an inner diameter of the second cylindrical section (2). Preferably, the transition section (3) comprises an outer surface with cylindrical (32) or truncated cone geometry. If the transition section (3) comprises an outer surface with truncated cone geometry, said outer surface comprises an upper part and a lower part, where the outer surface with truncated cone geometry of the transition section (3) has, in the lower part, a larger diameter which is equal to an outer diameter of the first cylindrical section (1), and in the upper part a smaller diameter which is greater than or equal to an outer diameter of the second cylindrical section (2).

The first cylindrical section (1) and/or the second cylindrical section (2) comprise at least one first sub-section (21) with a first inner diameter (51) and a second sub-section (22) with a second inner diameter (52), where the second sub-section (22) is higher than the first sub-section (21) and where the first inner diameter (51) of the first sub-section (21) is smaller than the second inner diameter (52) of the second sub-section (22), as observed in FIG. 4, so that the thickness of the first cylindrical section (1) and/or the second cylindrical section (2) are decreasing in height.

The concrete tower also comprises a top section (7) disposed on the second cylindrical section (2) or on an upper cylindrical section, where, preferably the top section (7) is a section which is intended to be executed in situ, or a prefabricated concrete element either formed by a single piece or formed by several modules. Preferably, the prefabricated concrete element is intended to be manufactured in the area close to the base of the concrete tower.

The concrete tower also comprises a lower section (10) which is lower than the first cylindrical section (1) where said lower section (10) of concrete tower has an outer diameter larger than the outer diameter of the first cylindrical section (1) and where the first cylindrical section (1) is intended to be executed on the lower section (10) of concrete tower. This lower section (10) may be cylindrical or truncated cone-shaped and is executed in situ preferably by means of non-climbing formworks.

The invention claimed is:

1. A manufacturing process of concrete towers for wind turbines comprising the following stages:
   in situ manufacturing of a first cylindrical section of concrete tower manufactured by means of a first cylindrical climbing formwork system; and
   in situ manufacturing of a second cylindrical section of concrete tower manufactured by means of the first cylindrical climbing formwork system so that an outer diameter of the second cylindrical section is smaller than an outer diameter of the first cylindrical section, where the in situ manufacturing of the second cylindrical section is completely carried out at a height greater than the in situ manufacturing of the first cylindrical section;
   building of an intermediate transition section before the in situ manufacturing of the second cylindrical section of the concrete tower;
   an adaptation stage of an outer formwork of the first cylindrical climbing formwork system to the outer diameter of the second cylindrical section after the building of the intermediate transition section and before the in situ manufacturing of the second cylindrical section;
   wherein the in situ manufacturing of the first cylindrical section and/or the in situ manufacturing of the second cylindrical section comprise a climbing sub-stage of the first cylindrical climbing formwork system, which comprises moving the first cylindrical framework system by a movement comprising only a vertical component; and
   an assembly stage of the first cylindrical climbing formwork system on a lower section of the concrete tower manufactured prior to the in situ manufacturing of the first cylindrical section of the concrete tower, wherein the lower section of the concrete tower is disposed below the first cylindrical section of the concrete tower.

2. The process of claim 1, wherein the building of the intermediate transition section and the in situ manufacturing of the second cylindrical section of the concrete tower are carried out until the second cylindrical section is an upper cylindrical section of concrete tower.

3. The process of claim 2, further comprising: building of a top section after the in situ manufacturing of the second cylindrical section, where said second cylindrical section is the upper cylindrical section of concrete tower.

4. The process of claim 3, wherein the building of the top section is carried out on the upper cylindrical section of concrete tower.

5. The process of claim 4 further comprising, before the building of the top section on the upper cylindrical section, an assembly stage of a second non-climbing formwork system for the in situ building of the top section.

6. The process of claim 3, wherein the building of the top section comprises a manufacturing stage of the top section in an area close to a base of the concrete tower, and an installation stage of the top section on the upper cylindrical section.

7. The process of claim 1, wherein the lower section of the concrete tower is manufactured in situ on a foundation of the concrete tower.

8. The process of claim 1, wherein the building of the intermediate transition section is carried out on the first cylindrical section.

9. The process of claim 8 further comprising, before the building of the intermediate transition section on the first cylindrical section, an adaptation stage of the first cylindrical climbing formwork system, for the in situ building of the intermediate transition section.

10. The process of claim 8 further comprising, before the building of the intermediate transition section on the first cylindrical section, an assembly stage of a first non-climbing formwork system for the in situ building of the intermediate transition section.

11. The process of claim 1, wherein the building of the intermediate transition section comprises a manufacturing stage of the intermediate transition section in an area close to a base of the concrete tower and an installation stage of the intermediate transition section on the first cylindrical section.

12. The process of claim 1, wherein the in situ manufacturing of the second cylindrical section is carried out so that an inner diameter of the second cylindrical section is smaller than an inner diameter of the first cylindrical section.

13. The process of claim 1, wherein the in situ manufacturing of the first cylindrical section and/or the second cylindrical section comprise:
- a lifting sub-stage of a framework;
- a fixing sub-stage of the framework to the previously manufactured cylindrical section;
- a closing sub-stage of the first cylindrical climbing formwork system;
- a pouring sub-stage of the concrete inside the first cylindrical climbing formwork system;
- an opening sub-stage of the first cylindrical climbing formwork system;
- prior to the climbing sub-stage of the first cylindrical climbing formwork system; and
- where all sub-stages are repeated until all of the first cylindrical section and/or all of the second cylindrical section, respectively, has been executed.

14. The process of claim 1, wherein the in situ manufacturing of the first cylindrical section and/or the in situ manufacturing of the second cylindrical section comprise a modification sub-stage of an inner formwork of the first cylindrical climbing formwork system.

* * * * *